(12) United States Patent
McCalley et al.

(10) Patent No.: US 9,638,944 B1
(45) Date of Patent: May 2, 2017

(54) SYSTEMS AND METHODS FOR SUBSTRATE LAMINATION

(71) Applicants: Cameron T. McCalley, Marion, IA (US); James D. Sampica, Anamosa, IA (US); Brian K. Smith, Marion, IA (US)

(72) Inventors: Cameron T. McCalley, Marion, IA (US); James D. Sampica, Anamosa, IA (US); Brian K. Smith, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 227 days.

(21) Appl. No.: 14/270,563

(22) Filed: May 6, 2014

(51) Int. Cl.
*G02F 1/1333* (2006.01)

(52) U.S. Cl.
CPC .................. *G02F 1/1333* (2013.01)

(58) Field of Classification Search
CPC ..................................................... G02F 1/1333
USPC ................................................. 156/285, 286
See application file for complete search history.

(56) References Cited

U.S. PATENT DOCUMENTS

| 3,089,801 | A | | 5/1963 | Tierney et al. |
|---|---|---|---|---|
| 3,616,197 | A | | 10/1971 | Amberg et al. |
| 3,851,758 | A | | 12/1974 | Makhijani et al. |
| 3,960,635 | A | * | 6/1976 | La Roy ............... B29C 43/3607 156/286 |
| 4,078,962 | A | | 3/1978 | Krueger |
| 4,188,254 | A | | 2/1980 | Hemperly, Jr. |
| 4,235,951 | A | | 11/1980 | Swarovski |
| 4,737,182 | A | | 4/1988 | Fecik et al. |
| 4,747,577 | A | | 5/1988 | Dimock |
| 4,756,735 | A | | 7/1988 | Cathers et al. |
| 5,108,532 | A | | 4/1992 | Thein et al. |
| 5,273,553 | A | | 12/1993 | Hoshi et al. |
| 5,329,391 | A | | 7/1994 | Miyamoto et al. |

(Continued)

FOREIGN PATENT DOCUMENTS

| EP | 0 556 351 B1 | 6/1995 |
|---|---|---|
| EP | 0 962 752 A1 | 12/1999 |

(Continued)

OTHER PUBLICATIONS

First Office Action with English Translation received in Korean Patent Application No. 10-2010-7017278, dated Feb. 24, 2015, 9 pages.

(Continued)

*Primary Examiner* — Jeff Aftergut
*Assistant Examiner* — Jaeyun Lee
(74) *Attorney, Agent, or Firm* — Donna P. Suchy; Daniel M. Barbieri

(57) ABSTRACT

A method for laminating substrates to form a laminated assembly includes positioning a first substrate and a second substrate within a lamination device having a first cavity and a second cavity; pressurizing the first cavity to a first pressure to move a flexible member into contact with one of the first and second substrate; depressurizing the first cavity to move the flexible member out of contact with the one of the first and second substrate; and pressurizing a second cavity to a second pressure higher than the first pressure to apply air pressure at the second pressure to the first and second substrate to form a laminated assembly.

20 Claims, 5 Drawing Sheets

(56) References Cited

U.S. PATENT DOCUMENTS

| | | |
|---|---|---|
| 5,365,356 A | 11/1994 | McFadden |
| 5,566,840 A | 10/1996 | Waldner et al. |
| 5,592,288 A | 1/1997 | Sampica et al. |
| 5,678,303 A | 10/1997 | Wichmann |
| 5,918,517 A | 7/1999 | Malapert et al. |
| 5,942,062 A | 8/1999 | Hassall et al. |
| 5,950,512 A | 9/1999 | Fields |
| 5,959,762 A | 9/1999 | Bandettini et al. |
| 6,128,066 A | 10/2000 | Yokozeki |
| 6,366,013 B1 | 4/2002 | Leenders et al. |
| 6,388,724 B1 | 5/2002 | Campbell et al. |
| 6,481,482 B1 | 11/2002 | Shimotomai |
| 6,614,057 B2 | 9/2003 | Silvernail et al. |
| 6,681,668 B1 | 1/2004 | Smirle |
| 6,739,929 B2 | 5/2004 | Furukawa et al. |
| 6,760,155 B2 | 7/2004 | Murayama et al. |
| 6,803,245 B2 | 10/2004 | Auch et al. |
| 6,832,538 B1 | 12/2004 | Hwang |
| 6,842,288 B1 | 1/2005 | Liu et al. |
| 6,908,202 B2 | 6/2005 | Graf et al. |
| 6,917,396 B2 | 7/2005 | Hiraishi et al. |
| 6,984,545 B2 | 1/2006 | Grigg et al. |
| 6,998,648 B2 | 2/2006 | Silvernail |
| 7,030,945 B2 | 4/2006 | Umemoto et al. |
| 7,273,403 B2 | 9/2007 | Yokota et al. |
| 7,349,154 B2 | 3/2008 | Aiura et al. |
| 7,361,240 B2 | 4/2008 | Kim |
| 7,381,110 B1 | 6/2008 | Sampica et al. |
| 7,435,311 B1 | 10/2008 | Marzen et al. |
| 7,446,938 B2 | 11/2008 | Miyatake et al. |
| 7,452,258 B1 | 11/2008 | Marzen et al. |
| 7,528,915 B2 | 5/2009 | Choi et al. |
| 7,551,451 B2 | 6/2009 | Kim et al. |
| 7,566,254 B2 | 7/2009 | Sampica et al. |
| 7,633,584 B2 | 12/2009 | Umemoto et al. |
| 7,814,676 B2 | 10/2010 | Sampica et al. |
| 7,927,440 B2 | 4/2011 | Matsuhira |
| 7,929,086 B2 | 4/2011 | Toyama et al. |
| 8,038,498 B2 | 10/2011 | Miyauchi et al. |
| 8,045,098 B2 | 10/2011 | Kitagawa et al. |
| 8,102,487 B2 | 1/2012 | Kitagawa et al. |
| 8,118,075 B2 | 2/2012 | Sampica et al. |
| 8,137,498 B2 | 3/2012 | Sampica et al. |
| 8,486,535 B1 | 7/2013 | Nemeth et al. |
| 8,540,002 B2 | 9/2013 | Sampica et al. |
| 8,603,288 B2 | 12/2013 | Sampica et al. |
| 8,691,043 B2 | 4/2014 | Sampica et al. |
| 2001/0035921 A1 | 11/2001 | Yamanami |
| 2001/0050372 A1 | 12/2001 | Krijn et al. |
| 2001/0053648 A1 | 12/2001 | Furukawa et al. |
| 2002/0043324 A1 | 4/2002 | Balduin et al. |
| 2002/0179229 A1 | 12/2002 | Chuzles |
| 2002/0186343 A1 | 12/2002 | Liao et al. |
| 2002/0187284 A1 | 12/2002 | Kinoshita et al. |
| 2003/0038916 A1 | 2/2003 | Nakano et al. |
| 2003/0043315 A1 | 3/2003 | Umemoto et al. |
| 2003/0067268 A1 | 4/2003 | Matsuoka |
| 2003/0089214 A1 | 5/2003 | Fukuta et al. |
| 2003/0156238 A1 | 8/2003 | Hiraishi et al. |
| 2003/0174396 A1 | 9/2003 | Murayama et al. |
| 2003/0180528 A1 | 9/2003 | Flosenzier et al. |
| 2003/0189606 A1 | 10/2003 | Moon et al. |
| 2004/0066645 A1 | 4/2004 | Graf et al. |
| 2004/0130073 A1 | 7/2004 | Yamazaki et al. |
| 2005/0126679 A1 | 6/2005 | Kim |
| 2005/0136625 A1 | 6/2005 | Henseler et al. |
| 2005/0249946 A1 | 11/2005 | Hsu et al. |
| 2006/0035060 A1 | 2/2006 | Koyama et al. |
| 2006/0098452 A1 | 5/2006 | Choi et al. |
| 2006/0207967 A1 | 9/2006 | Bocko et al. |
| 2006/0215265 A1 | 9/2006 | Miyatake et al. |
| 2006/0245171 A1 | 11/2006 | Kim et al. |
| 2006/0290253 A1 | 12/2006 | Yeo et al. |
| 2007/0022895 A1 | 2/2007 | Lee et al. |
| 2007/0031997 A1 | 2/2007 | Lee et al. |
| 2007/0228586 A1 | 10/2007 | Merrill et al. |
| 2007/0297736 A1 | 12/2007 | Sherman et al. |
| 2008/0145610 A1 | 6/2008 | Muller et al. |
| 2008/0305721 A1 | 12/2008 | Ohashi et al. |
| 2009/0040772 A1 | 2/2009 | Laney |
| 2009/0046229 A1 | 2/2009 | Umemoto et al. |
| 2009/0120572 A1 | 5/2009 | Sampica et al. |
| 2009/0120585 A1 | 5/2009 | Sampica et al. |
| 2009/0126872 A1 | 5/2009 | Sampica et al. |
| 2009/0148682 A1 | 6/2009 | Higuchi |
| 2009/0153783 A1 | 6/2009 | Umemoto |
| 2009/0183381 A1 | 7/2009 | Sampica et al. |
| 2009/0183615 A1 | 7/2009 | Sampica et al. |
| 2009/0186218 A1 | 7/2009 | Sampica et al. |
| 2009/0279030 A1 | 11/2009 | Toyama et al. |
| 2009/0279175 A1 | 11/2009 | Laney et al. |
| 2010/0103353 A1 | 4/2010 | Yamada |
| 2010/0297406 A1 | 11/2010 | Schaffer et al. |
| 2011/0075070 A1 | 3/2011 | Kitagawa et al. |
| 2011/0085279 A1 | 4/2011 | Lanagan et al. |
| 2011/0141405 A1 | 6/2011 | Kitagawa et al. |
| 2011/0165361 A1 | 7/2011 | Sherman et al. |

FOREIGN PATENT DOCUMENTS

| | | | |
|---|---|---|---|
| EP | 0 711 103 B1 | 3/2000 | |
| FR | 2673571 A1 * | 9/1992 | ........... B29C 70/443 |
| JP | 01-210328 | 8/1989 | |
| JP | 05-200880 | 8/1993 | |
| JP | 05-293895 | 11/1993 | |
| JP | 06-051484 | 2/1994 | |
| JP | H08-220547 A | 8/1996 | |
| JP | 09-057779 | 3/1997 | |
| JP | 10-156853 | 6/1998 | |
| JP | 10-244589 | 9/1998 | |
| JP | 2000-141388 | 5/2000 | |
| JP | 2000-176931 | 6/2000 | |
| JP | 2001-005401 A | 1/2001 | |
| JP | 2001-166272 | 6/2001 | |
| JP | 2002-137352 | 5/2002 | |
| JP | 2002-313688 | 10/2002 | |
| JP | 2003-288028 | 10/2003 | |
| JP | 2004-058349 | 2/2004 | |
| JP | 2004-233590 | 8/2004 | |
| JP | 2004-354645 | 12/2004 | |
| JP | 2005-005029 | 1/2005 | |
| JP | 2005-116346 | 4/2005 | |
| JP | 2006-218658 | 8/2006 | |
| JP | 2006-222267 | 8/2006 | |
| JP | 2006-290960 | 10/2006 | |
| JP | 2006-334912 | 12/2006 | |
| JP | 2006-348208 | 12/2006 | |
| JP | 2007-206559 | 8/2007 | |
| JP | 2007-302398 A | 11/2007 | |
| JP | 2008-238607 | 1/2008 | |
| KR | 10-1999-029922 | 4/1999 | |
| KR | 2001-166272 | 6/2001 | |
| KR | 10-2007-0016614 | 2/2007 | |
| WO | WO-93/05634 | 3/1993 | |
| WO | WO-2004/046230 | 6/2004 | |
| WO | WO-2005/098522 | 10/2005 | |
| WO | WO-2007/063818 | 6/2007 | |
| WO | WO-2011/089474 A2 | 7/2011 | |

OTHER PUBLICATIONS

Donald, "Methods for improving the mechanical properties of oxide glasses," Journal of Materials Science 24, (1989), pp. 4177-4208.

Non-Final Office Action on U.S. Appl. No. 13/867,556 Dated Apr. 10, 2015, 11 pages.

Non-Final Office Action on U.S. Appl. No. 14/070,251, dated Nov. 6, 2015, 9 pages.

Office Action in Japanese Patent Application 2015-116688, dated Aug. 25, 2015, 4 pages.

Office Action in Japanese Patent Application 2015-116716, dated Aug. 25, 2015, 3 pages.

Office Action with English Translation received in Korean Patent Application 10-2010-7017278, dated Aug. 26, 2015, 5 pages.

(56) References Cited

OTHER PUBLICATIONS

Final Office Action on U.S. Appl. No. 14/070,251 dated Apr. 7, 2016, 12 pages.
English Translation of Japanese Notice of Reasons for Rejection in Japanese Patent Application No. JP 2013-251126, dated Oct. 15, 2014, 3 pages.
Notice of Allowance for U.S. Appl. No. 12/009,482 Dated Oct. 6, 2014, 8 pages.
Non-Final Office Action on U.S. Appl. No. 13/867,556 Dated Nov. 25, 2014, 10 pages.
Extended European Search Report for European Patent Application No. 14161363, dated May 16, 2014, 6 pages.
Final Office Action on U.S. Appl. No. 13/867,556 Dated Jul. 3, 2014, 11 pages.
Second Office Action for Chinese Patent Application No. 2009801072945, dated May 30, 2014 with English translation, 4 pages.
Advisory Action for U.S. Appl. No. 12/009,472, mail date Feb. 25, 2013, 3 pages.
Advisory Action for U.S. Appl. No. 12/009,482, mail date Oct. 28, 2013, 3 pages.
Advisory Action for U.S. Appl. No. 13/538,957, mail date Jun. 14, 2013, 6 pages.
International Search Report for Application No. PCT/US2009/031151, mail date Aug. 28, 2009, 3 pages.
Kipp, D.O. (2004;2010). Plastic Material Data Sheets. MatWeb—Division of Automation Creation, Inc., Online version available at: http://www.knovel.com/web/portal/browse/display?_EXT_KNOVEL_DISPLAY_bookid=1023&VerticalID=0, at least as early as Aug. 10, 2011, 6 pages.
Notice of Allowance for U.S. Appl. No. 12/009,372, mail date Oct. 13, 2011, 8 pages.
Notice of Allowance for U.S. Appl. No. 12/009,373, mail date Jun. 16, 2010, 4 pages.
Notice of Allowance for U.S. Appl. No. 12/009,375, mail date Nov. 21, 2013, 12 pages.
Notice of Allowance for U.S. Appl. No. 12/009,393, mail date Nov. 14, 2011, 7 pages.
Notice of Allowance for U.S. Appl. No. 12/009,472, mail date Sep. 5, 2013, 8 pages.
Notice of Allowance for U.S. Appl. No. 12/786,169, mail date Mar. 28, 2013, 6 pages.
Notice of Allowance for U.S. Appl. No. 13/420,381, mail date Feb. 11, 2013, 12 pages.
Notice of Allowance for U.S. Appl. No. 13/420,381, mail date May 20, 2013, 8 pages.
Notice of Allowance for U.S. Appl. No. 13/538,957, mail date Oct. 3, 2013, 13 pages.
Notice of Allowance on U.S. Appl. No. 14/019,429 Dated Feb. 5, 2014, 7 pages.
Office Action for Chinese Application No. 200980107294.5, mail date Oct. 8, 2013, 5 pages.
Office Action for U.S. Appl. No. 12/009,372, mail date Dec. 20, 2010, 10 pages.
Office Action for U.S. Appl. No. 12/009,372, mail date Jun. 13, 2011, 9 pages.
Office Action for U.S. Appl. No. 12/009,373, mail date Dec. 30, 2009, 14 pages.
Office Action for U.S. Appl. No. 12/009,375, mail date Jul. 3, 2013, 14 pages.
Office Action for U.S. Appl. No. 12/009,375, mail date Jul. 22, 2011, 8 pages.
Office Action for U.S. Appl. No. 12/009,375, mail date Mar. 28, 2011, 9 pages.
Office Action for U.S. Appl. No. 12/009,393, mail date Jul. 20, 2011, 8 pages.
Office Action for U.S. Appl. No. 12/009,472, mail date Apr. 16, 2012, 16 pages.
Office Action for U.S. Appl. No. 12/009,472, mail date Jan. 14, 2011, 14 pages.
Office Action for U.S. Appl. No. 12/009,472, mail date Mar. 20, 2013, 15 pages.
Office Action for U.S. Appl. No. 12/009,472, mail date Nov. 3, 2011, 15 pages.
Office Action for U.S. Appl. No. 12/009,472, mail date Nov. 9, 2012, 15 pages.
Office Action for U.S. Appl. No. 12/009,482, mail date Feb. 21, 2012, 20 pages.
Office Action for U.S. Appl. No. 12/009,482, mail date Jun. 28, 2013, 22 pages.
Office Action for U.S. Appl. No. 12/009,482, mail date Nov. 21, 2012, 20 pages.
Office Action for U.S. Appl. No. 12/009,482, mail date Aug. 16, 2011, 16 pages.
Office Action for U.S. Appl. No. 12/786,169, mail date Jan. 18, 2013, 14 pages.
Office Action for U.S. Appl. No. 13/538,957, mail date Apr. 4, 2013, 19 pages.
Office Action for U.S. Appl. No. 13/538,957, mail date Oct. 5, 2012, 18 pages.
Office Action for U.S. Appl. No. 12/786,169, mail date Jul. 20, 2012, 8 pages.
Office Action for U.S. Appl. No. 13/420,381, mail date Sep. 18, 2012, 9 pages.
Office Action on U.S. Appl. No. 12/009,482 Dated Feb. 4, 2014, 14 pages.
Office Action on U.S. Appl. No. 13/867,556 Dated Feb. 7, 2014, 11 pages.
Restriction Requirement for U.S. Appl. No. 12/009,482, mail date May 13, 2011, 6 pages.
Restriction Requirement for U.S. Appl. No. 13/867,556, mail date Dec. 26, 2013, 6 pages.
Walker, GD—Itronix Dynavue Technology, The Ultimate Outdoor-Readable Touch-Screen Display, Rugged PC Review, 4 pages.
Final Office Action on U.S. Appl. No. 14/270,587, dated Nov. 3, 2016, 17 pages.
First Office Action on Korean Patent Application No. 10-2016-7013740, dated Sep. 19, 2016, 7 pages.
Non-Final Office Action on U.S. Appl. No. 14/070,251, dated Aug. 11, 2016, 6 pages.
Extended European Search Report on Application No. EP 16188276.6, dated Jan. 26, 2017, 7 pages.
Office Action on Japanese Application No. JP 2016-001165, dated Jan. 10, 2017, 6 pages.

\* cited by examiner

US 9,638,944 B1

SYSTEMS AND METHODS FOR SUBSTRATE LAMINATION

CROSS-REFERENCE TO RELATED PATENT APPLICATIONS

The following U.S. Patents Applications are incorporated herein by reference in their entireties: U.S. application Ser. No. 12/009,375, filed Jan. 18, 2008, now U.S. Pat. No. 8,691,043; U.S. application Ser. No. 12/009,472, filed Jan. 18, 2008, now U.S. Pat. No. 8,603,288; U.S. application Ser. No. 12/009,373, filed Jan. 18, 2008, now U.S. Pat. No. 7,814,676; U.S. application Ser. No. 12/009,393, filed Jan. 18, 2008, now U.S. Pat. No. 8,137,498; U.S. application Ser. No. 12/009,372, filed Jan. 18, 2008, now U.S. Pat. No. 8,118,075; and U.S. application Ser. No. 12/009,482, filed Jan. 18, 2008, published as U.S. Patent Application Publication No. 2009-120585.

BACKGROUND

The present disclosure relates generally to the field of systems and methods for producing laminated assemblies such as display assemblies. Display assemblies may include one or more laminated substrates. For example, liquid crystal display (LCD) screens and similar devices may require rigid or semi-rigid substrates to be coupled to the display. These substrates may serve many purposes, including optical enhancements, protection from impact, environmental protection, improvements in thermal operating ranges, and the like.

SUMMARY

One embodiment relates to a method for laminating substrates to form a laminated assembly, comprising positioning a first substrate and a second substrate within a lamination device having a first cavity and a second cavity; pressurizing the first cavity to a first pressure to move a flexible member into contact with one of the first and second substrate; depressurizing the first cavity to move the flexible member out of contact with the one of the first and second substrate; and pressurizing a second cavity to a second pressure higher than the first pressure to apply air pressure at the second pressure to the first and second substrate to form a laminated assembly.

Another embodiment relates to a method for laminating substrates to form a laminated assembly, comprising positioning a first substrate and a second substrate within a cavity of a lamination device; generating a vacuum environment surrounding the first and second substrate; applying a first pressure to a flexible member to move the flexible member into contact with one of the first and second substrate; moving the flexible member out of contact with the one of the first and second substrate; and applying air pressure at a second pressure higher than the first pressure to the first and second substrate to form a laminated assembly.

Another embodiment relates to a method for laminating rigid substrates to form a laminated assembly, comprising providing a lamination device having an upper member forming an upper cavity and a lower member forming a lower cavity; positioning a first substrate and a second substrate within the lower cavity; disposing a layer of pressure-sensitive adhesive between the first substrate and the second substrate; generating a vacuum within the lower cavity; pressurizing the upper cavity to a first pressure to move a flexible member into contact with the first substrate; depressurizing the upper cavity to move the flexible member out of contact with the first substrate; and pressurizing the lower cavity to a second pressure higher than the first pressure to apply air pressure at the second pressure to the first and second substrate to form a laminated assembly.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
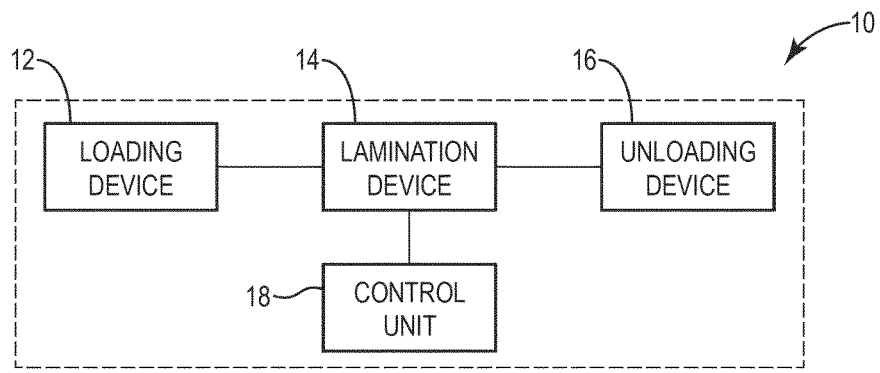
FIG. 1 is a schematic illustration of a lamination system according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to FIG. 1, lamination system 10 is shown according to one embodiment. As discussed in greater detail below, through the specific control of the application of heat and pressure, various embodiments disclosed herein provide systems and methods for producing laminated assemblies using less equipment, and in less time, than many more conventional techniques. Lamination system 10 includes lamination device 14, control unit 18, and optionally, one or both of loading device 12 and unloading device 16. Lamination system 10 is usable to form various types of laminated assemblies by laminating rigid or semi-rigid assemblies together. In one embodiment, loading device 12 and/or unloading device 16 are omitted, and substrates are manually loaded into and unloaded from lamination device 14. In other embodiments, loading device 12 loads substrates into lamination device 14, and unloading device 16 removes the laminated assemblies from lamination device 14. In other embodiments, a single device (e.g., similar to devices 12, 16) is positioned to load substrates to and unload substrates from lamination device 14.

Figure 2:
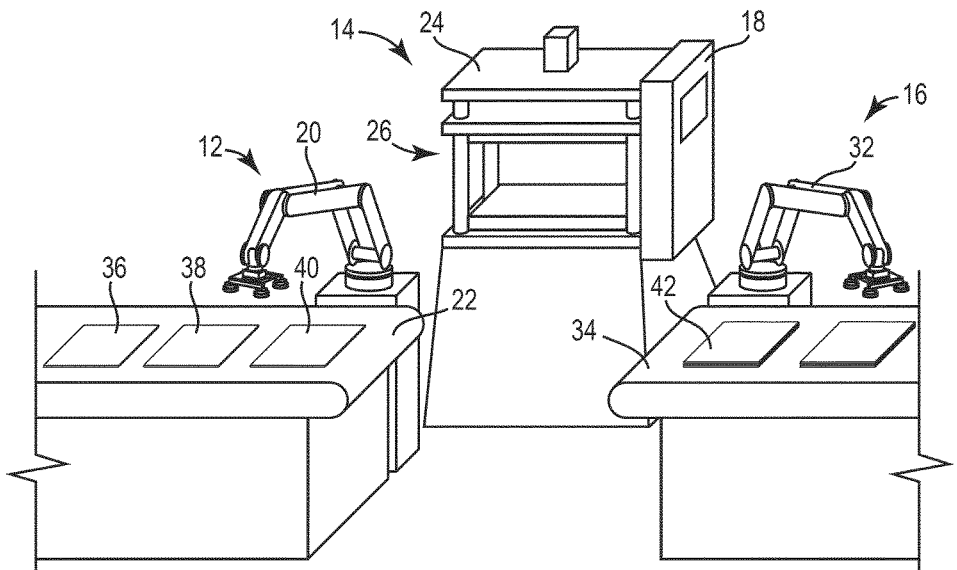
FIG. 2 is a perspective view of the lamination system of FIG. 1 according to one embodiment.

Loading device 12 is configured to position one or more substrates within lamination device 14. For example, as shown in FIG. 2, loading device 12 includes a mechanical or robotic loader 20 configured to move substrates 36, 38, 40 (see FIG. 8) from loading surface 22 to lamination device 14. Similarly, unloading device 16 includes a mechanical or robotic unloader 32 configured to move laminated assemblies 42 (see FIG. 7) from lamination device 14 to a unloading surface 34. From unloading surface 34, laminated assemblies 42 may be subjected to further processing, quality control inspections, and the like. According to various alternative embodiments, other types of loading and/or unloading devices may be used.

Referring to FIGS. 2-6, lamination device 14 is shown in greater detail according to one embodiment. Lamination device 14 includes press 24 and lamination chamber 26. Lamination device 14 and/or press 24 may in some embodiments be or include a clamping device configured to provide a clamping force for lamination device 14. Press 24 is used to maintain lamination chamber 26 in an open or a closed position, and to move lamination chamber 26 between the open and closed positions. In various alternative embodiments, clamping of press 24 can be accomplished through manual or automated means. Lamination chamber 26 includes first, or upper member 28, and second, or lower member 30. When lamination chamber 26 is in the closed position, upper member 28 and lower member 30 contact each other and form a lamination cavity. The lamination cavity includes first, or upper cavity 46 formed by upper member 28 and flexible member 52, and second, or lower cavity 48, formed by flexible member 52 and lower member 30.

Figure 4:
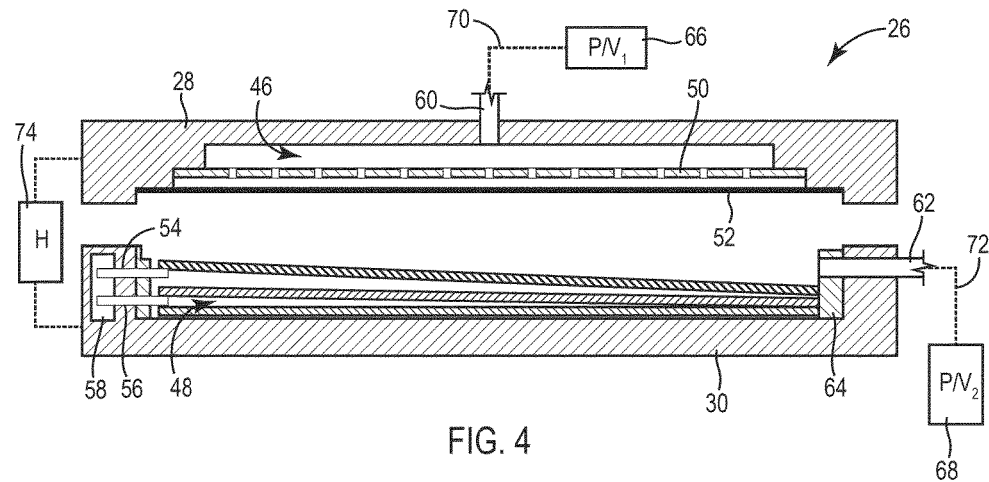
FIG. 4 is a cross-sectional view of a lamination device in an open position according to one embodiment.
Figure 5:
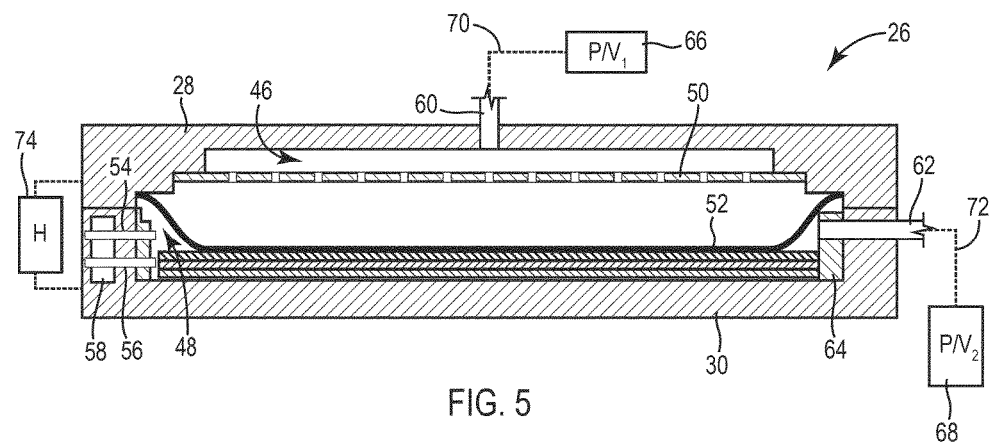
FIG. 5 is a cross-sectional view of the lamination device of FIG. 4 in a closed position and with an expanded flexible member according to one embodiment.
Figure 6:
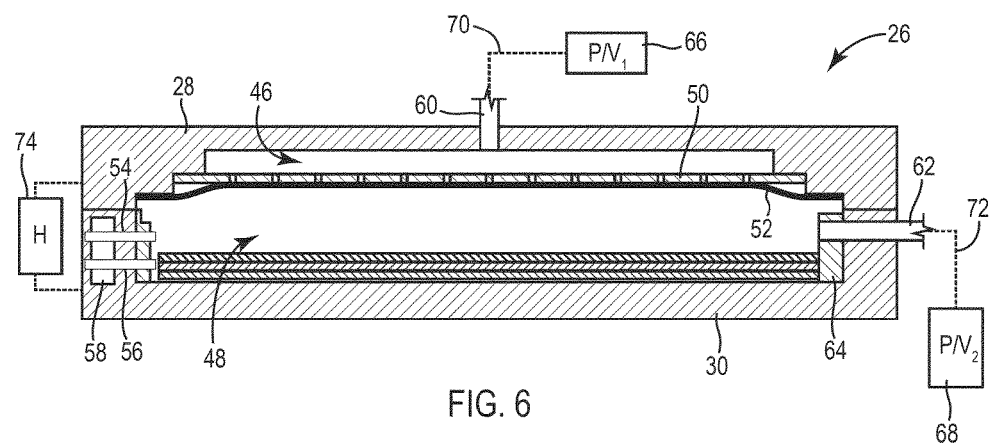
FIG. 6 is a cross-sectional view of the lamination device of FIG. 4 in a closed position and with a retracted flexible member according to one embodiment.

As shown in FIGS. 4-6, lamination device 14 includes diffuser 50 (e.g., a mechanical diffuser/screen, etc.) and flexible member 52 (e.g., a membrane, etc.). Flexible member 52 in one embodiment is coupled to upper member 28 such that upper cavity 46 is a sealed cavity. Diffuser 50 is provided adjacent to flexible member 52 and is configured to provide uniform distribution of airflow between flexible member 52 and the remainder of upper cavity 46. Upper cavity 46 is in fluid communication with pressurization source 66 (e.g., a vacuum pump, compressor, etc.) via line 70. Pressurization source 66 is configured to pressurize/depressurize upper cavity 46. For example, pressurization source 66 can provide environments of relatively higher pressure, or alternatively, provide environments of relatively lower pressures (e.g., vacuum environments).

Flexible member 52 (e.g., a flexible membrane, bladder, etc.) is configured to be movable by pressurization and depressurization of upper cavity 46 and/or lower cavity 48. For example, pressurizing upper cavity 46 will result in flexible member 52 moving downward toward lower member 30 (see, e.g., FIG. 5). Flexible member 52 may be made of any suitable material capable of providing the desired flexibility. In some embodiments, flexible member 52 is made of a silicone rubber, and has characteristics such as an elongation capacity of at least 100%, a tear strength of at least 30 psi, and anti-static properties and/or an anti-static liner (e.g., polyester, polyethylene, etc.) disposed on one or more surfaces. Flexible member 52 is configured to enable upper cavity 46 and lower cavity 48 to be maintained at different pressure levels. As shown in FIGS. 4-6, in one embodiment, flexible member 52 is coupled to an outer portion of upper member 28 (e.g., an outer edge, an outer area, etc.) by way of an air-tight seal. In other embodiments, flexible member 52 may be coupled to other components or by way of other sealing methods.

Lamination device 14 further includes one or more substrate supports 54, 56. Supports 54, 56 are configured to maintain a separation between substrates 36, 38, 40 prior to laminating the substrates together. Supports 54, 56 may be any device/structure capable of maintaining substrates in spatial separation (e.g., such that at least portions of adjacent substrates are spatially separated) when disposed within lamination chamber 26. In one embodiment, supports 54, 56 are generally cylindrical support pins that are extendible into and retractable from the interior of lamination chamber 26 by operation of actuator 58. Supports 54, 56 may have any suitable size or shape, and more or fewer supports than those shown in FIGS. 4-6 may be used. Furthermore, rather than support pins, supports 54, 56 may alternatively take the form of a deformable support (e.g. a foam or spring material, etc.), an electromagnetic support (e.g., an electromagnet operably coupled to a metallic component), a retractable air cylinder or solenoid, etc. Actuator 58 may include any suitable actuation mechanism, such as an electric motor, solenoid, etc. In yet further embodiments, supports 54, 56 are configured to be manually retracted/extended (e.g., by hand manipulation of a user, etc.).

As shown in FIG. 4, supports 54, 56 are configured to maintain spatial separation between substrates 36, 38, 40 upon initial placement of the substrates within lamination chamber 26. When desired, supports 54, 56 are retracted (e.g., by way of actuator 58), such that substrates 36, 38, 40 are brought into substantially complete contact with each other due to gravity effects. As discussed in greater detail below, in one embodiment, spatial separation is maintained between substrates 36, 38, 40 until a vacuum environment is generated around substrates 36, 38, 40.

According to one embodiment, a vacuum environment is generated within lower cavity 48. As shown in FIGS. 4-6, lower member 30 includes lower port 62 coupled to second pressurization device 68 (e.g., a vacuum pump, a compressor, etc.) via line 72. Second pressurization device 68, like first pressurization device 66, is able to increase or decrease the pressure within lower cavity 48. As such, the pressure within lower cavity 48 can be increased or decreased by operation of pressurization device 68. In one embodiment, lamination device 14 is configured such that a vacuum environment is generated after substrates 36, 38, 40 are placed within lower cavity 48, and a higher pressure environment is later generated after flexible member 52 applies a force to initially couple substrates 36, 38, 40 together. As such, both upper and lower cavities 46, 48 can provide environments of relatively higher or lower pressure. Collectively, pressurization devices 66, 68 form a pressurization system 69 (see FIG. 3) for lamination device 14. Further, in some embodiments, only a single pressurization device is used to control the pressure within both upper and lower cavities 46, 48.

In one embodiment, lamination device 14 is configured to operate at elevated temperatures. As such, lamination device 14 may further include heater 74 (e.g., temperature control system, etc.). Heater 74 can be any suitable heating or cooling device or system, and can include components that are separate from or integrated into one or more components of lamination device 14. For example, one or more components of heater 74 may be integrated into one or both of upper member 28 and lower member 30. Heater 74 can maintain lamination device 14 at a desired elevated temperature (e.g., 80 degrees Celsius, more or less than 80 degrees Celsius, etc.) for extended periods of time (e.g., during a complete lamination process, during multiple lamination processes, etc.). In one embodiment, one or more target temperatures for a lamination process are based on one or both of the type(s) of adhesives used to bond the substrates, and the types of substrates being used. In further embodiments, heater 74 is configured to cycle the temperature between an elevated temperature during lamination of components and ambient or room temperature between lamination processes. For example, an elevated temperature may be maintained within the lamination device until just prior to reducing the elevated pressure in the lower cavity, at which point the temperature is reduced to ambient/room temperature.

Referring further to FIGS. 4-6, in one embodiment lamination device includes an alignment insert 64. Insert 64 is configured to facilitate alignment of one or more of substrates 36, 38, 40 or other components positioned within lamination chamber 26. Alignment insert 64 may be a generally planar member configured to be positioned within lower cavity 48. In one embodiment, insert 64 includes one or more recesses, or alignment cavities, configured to receive and generally correspond with the shape of the substrates. According to various alternative embodiments, more than one insert 64, or inserts with multiple cavities can be utilized to accommodate substrates of different size, different numbers of substrates, etc.

Figure 3:
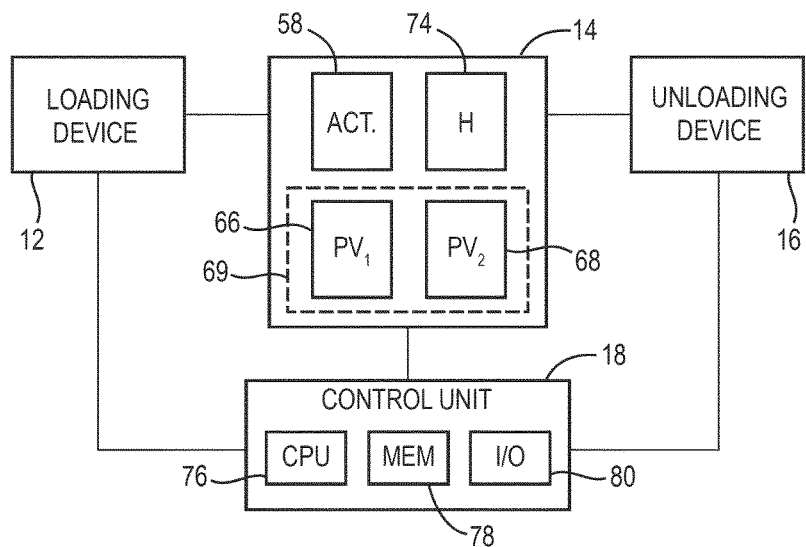
FIG. 3 is a block diagram of a control system for the lamination system of FIG. 1 according to one embodiment.

Referring back to FIGS. 1 and 3, a control system for lamination system 10 is shown according to one embodiment. As shown in FIG. 3, control unit 18 is coupled to and configured to control the operation of loading device 12, lamination device 14, and unloading device 16. Control unit 18 may further control operation of any sub-components of loading device 12, lamination device 14, and unloading device 16. For example, in one embodiment, control unit 18 controls operation of actuator 58, pressurization system 69 (including pressurization devices 66, 68), and heater 74.

Control unit 18 includes processor 76, memory 78, and input/output device 80. Processor 76 may be implemented as a general-purpose processor, an application specific integrated circuit (ASIC), one or more field programmable gate arrays (FPGAs), a digital-signal-processor (DSP), a group of processing components, or other suitable electronic processing components. Memory 78 is one or more devices (e.g., RAM, ROM, Flash Memory, hard disk storage, etc.) for storing data and/or computer code for facilitating the various processes described herein. Memory 78 may be or include non-transient volatile memory or non-volatile memory. Memory 78 may include database components, object code components, script components, or any other type of information structure for supporting the various activities and information structures described herein. Memory 78 may be communicably connected to processor 76 and provide computer code or instructions to processor 76 for executing any of the processes described herein.

Input/output device 80 may be any suitable device enabling users to provide inputs to and/or receive outputs from control unit 18. For example, device 80 may include one or more of a display monitor, touchscreen display, input buttons/keyboard, microphone, speaker, and the like. Control unit 18 is configured to control operation of lamination system 10 based on data stored in memory 78 and/or inputs received via input/output device 80. It should be noted that in various alternative embodiments, the various components of lamination system 10, including loading device 12, lamination device 14, unloading device 16, control unit 18, and any subcomponents thereof, may communicate with each other using any suitable wired or wireless communications protocol. It should also be noted that according to various further embodiments, the components shown in FIG. 3 may be integrated together or divided into further subcomponents. All such variations are to be understood to be within the scope of the present disclosure.

Figure 7:
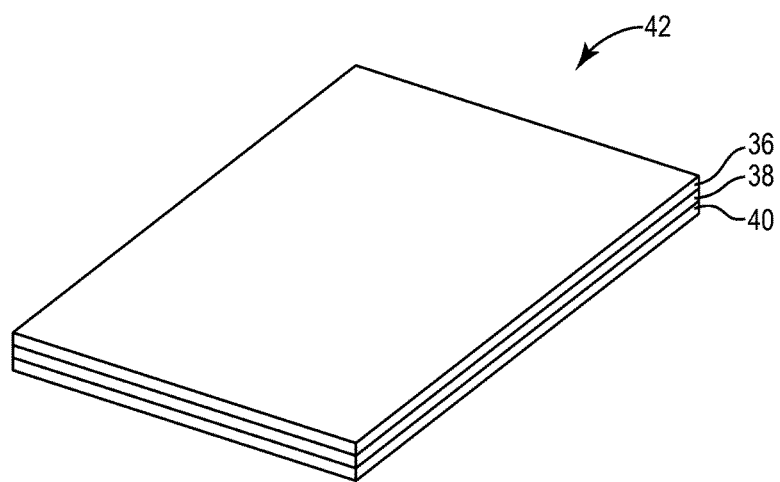
FIG. 7 is a perspective view of a laminated assembly according to one embodiment.
Figure 8:
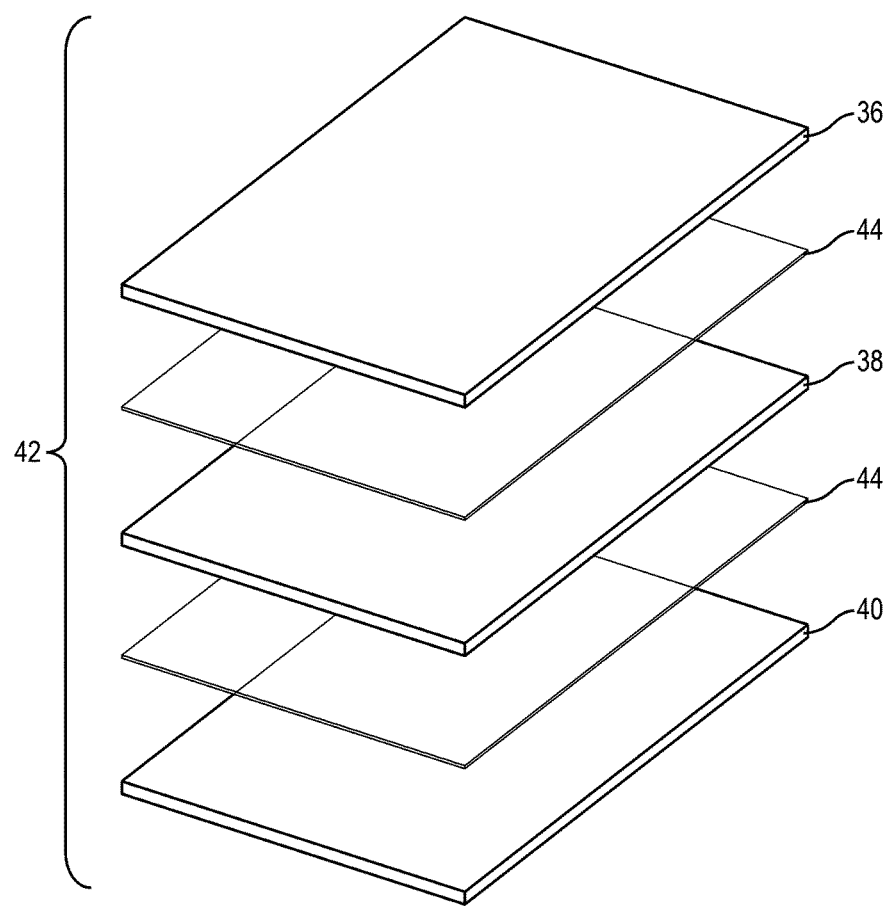
FIG. 8 is an exploded perspective view of the laminated assembly of FIG. 7 according to one embodiment.

Referring to FIGS. 7-8, laminated assembly 42 is shown according to one embodiment. As shown in FIG. 7, laminated assembly 42 is formed from substrates 36, 38, 40. Adhesive layers 44 may be disposed between adjacent surfaces of substrates 36, 38, 40. In one embodiment, adhesive layer 44 is a pressure-sensitive adhesive material. In other embodiments, adhesive layer 44 can take other forms. In further embodiments, adhesive layer 44 is bonded (e.g., pre-adhered) to one or more of substrates 36, 38, 40 prior to substrates 36, 38, 40 being placed into lamination device 14. While three substrates are shown in FIGS. 7-8, more or fewer substrates (e.g., 2, 4, etc.) may be used to form laminated assembly 42 according to various, alternative embodiments.

Substrates 36, 38, 40 can be a wide variety of rigid or semi-rigid substrates. For example, any of the substrates may be or include a display monitor (e.g., LCD, LED, etc.), a touchscreen layer, a coverglass, heater assembly, and the like. The various substrates may be transparent, translucent, or opaque, and be made of any suitable material, including glass, plastic, and the like. Adhesive layer 44 may be any suitable adhesive, including acrylic or silicone based polymer materials, pressure sensitive sheets of adhesive material, b-stage type adhesives, thermosets, thermoplastics, and the like, and different adhesive layers may have different thicknesses. According to various alternative embodiments, the size, shape, and other characteristics (e.g., strength characteristics, optical characteristics, etc.) may be varied to suit a particular application.

Figure 9:
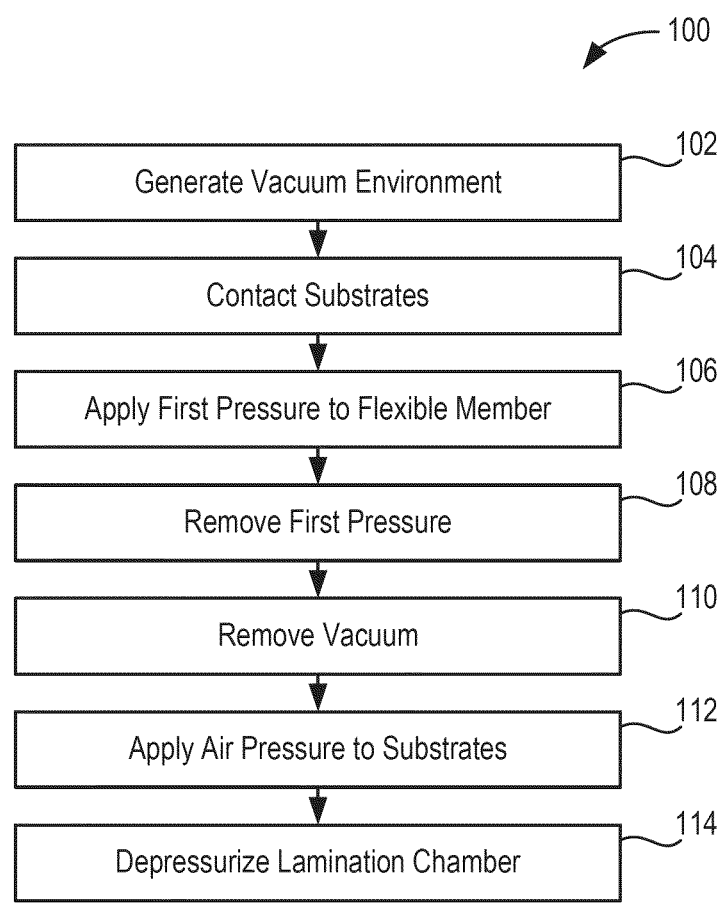
FIG. 9 is a block diagram illustrating a method for producing laminated assemblies according to one embodiment.

Referring now to FIG. 9, method 100 for producing a laminated assembly is shown according to one embodiment. A vacuum is generated (102) within a lamination chamber in which first and second substrates are positioned. In one embodiment, a vacuum environment is generated by a vacuum pump such as pressurization device 68 applying a vacuum to lower cavity 48 via port 62 and line 72. During this step, the substrates are maintained in spatial separation (e.g., using one or more supports such as supports 54, 56). Once the vacuum is generated, the substrates are brought into contact with each other (104) (e.g., by retracting one or more supports such as supports 54, 56). A first pressure is applied to a flexible member to move the flexible member into contact with a surface of the substrates and apply a pressure to the substrates (106). In one embodiment, applying a first pressure to the flexible membrane includes pressurizing an upper cavity of a lamination chamber using a compressor such as pressurization device 66 and a pressurization port such as upper port 60. As the upper cavity is pressurized, the flexible member elongates into contact with the substrates and applies a compressive force to the substrates.

After the flexible member is moved into contact with the substrates, the first pressure is removed (e.g. by depressurizing the upper cavity) such that the flexible member retracts out of a contacting position with the substrates (108). The vacuum is then removed (110) by re-pressurizing the lower chamber. To ensure a complete bond between the substrates and minimize optical defects (e.g., bubbles, etc.), the lower chamber is then pressurized to a second pressure (e.g., approximately 100 psi) to apply air pressure to the various substrates (112). In one embodiment, the second pressure (e.g. the air pressure applied to the substrates) is greater than the first pressure (e.g., the pressure used to apply a compressive force to the substrates via the flexible membrane). As used herein, air pressure may include any pressure exerted by a fluid within the upper/lower cavity on, for example, one or more substrates or a lamination assembly. The elevated second pressure is maintained for a predetermined period of time (e.g., between 1 and 5 minutes, etc.), and then the lamination chamber is depressurized (140). After depressurization, the laminated assembly is fully laminated and ready for further processing, inspection, etc.

Figure 10:
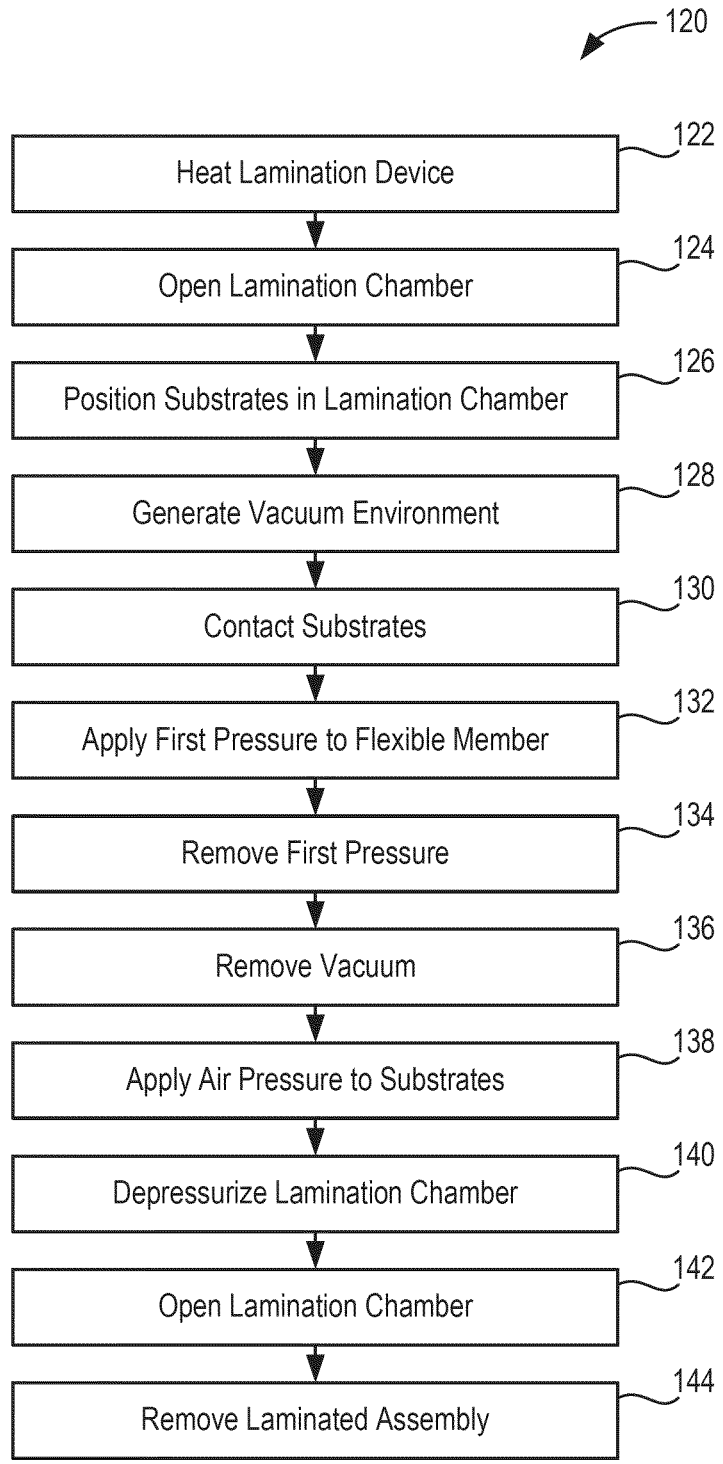
FIG. 10 is a block diagram illustrating a method for producing laminated assemblies according to another embodiment.

It should be noted that various additional steps may be performed in connection with those illustrated in FIG. 9, such as heating the lamination device, automatically loading and unloading the substrates and laminated assemblies, etc. For example, referring now to FIG. 10, a method 120 for producing a laminated assembly is shown according to one embodiment. First, a lamination device is heated (122). In one embodiment, lamination device 14 is heated by control unit 18 controlling operation of heater 74. The lamination device may be heated to any suitable elevated temperature (e.g., 80 degrees Celsius, more or less than 80 degrees Celsius, etc.), and maintained at the elevated temperature throughout the lamination process. Alternatively, the temperature of the lamination device may be varied at different times during the lamination process. The lamination device is opened (124) and one or more substrates are positioned within the lamination chamber (126). In one embodiment, an automated loading device is utilized to load substrates and other components into the lamination chamber. In other embodiments, substrates may be manually loaded into the lamination chamber. An alignment insert may be used to properly align the various substrates. Once the substrates are positioned within the lamination chamber, the lamination chamber is closed, and a vacuum is generated in a similar manner to that disclosed with respect to step 102 in FIG. 9. Steps 128-140 are substantially the same as steps 102 through 114 of method 100, such that a vacuum is generated (128), the substrates are brought into contact with each other (130), and a first pressure is applied to the flexible membrane (132). The first pressure is then removed (134), the vacuum is removed (136), and air pressure at a second, higher pressure is applied to the substrates (138). The lamination chamber is then depressurized (140).

Once the chamber is depressurized (140), the lamination chamber is opened (142), and the laminated assembly is unloaded (144). In one embodiment, an automated unloading device is utilized to unload the laminated assembly from the lamination chamber. In other embodiments, the laminated assembly may be manually unloaded from the lamination chamber.

It should be noted that while the Figures generally show a single laminated assembly formed by way of lamination device 14, according to various alternative embodiments, multiple laminated assemblies may be formed simultaneously using the same systems and methods such as those described herein. For example, multiple stacks of substrates may be aligned by providing an alignment insert similar to insert 64 with multiple alignment cavities (e.g., one cavity for each laminated assembly to be formed).

The present systems and methods may provide various advantages over more traditional lamination processes. For example, the specific heating and air pressure applied to the substrates may eliminate additional machinery (e.g., autoclaves, etc.) and steps (e.g., separate heating steps, etc.), resulting in savings in time and space and equipment costs. Furthermore, the one-piece flow enabled by the various embodiments eliminates costly batch processing of components (e.g., batch autoclave cycles, etc.), further streamlining the production cycle and minimizing potential errors resulting from parts tracking, etc. The system can also be enlarged to accommodate multiple lamination assemblies while still providing the benefits of a single cycle lamination process.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for laminating substrates to form a laminated assembly, comprising:
    positioning a first substrate and a second substrate within a lamination device having a first cavity at least partially defined by a first side of a flexible member and a second cavity at least partially defined by a second side of the flexible member;
    pressurizing the first cavity to a first pressure to move the flexible member into contact with one of the first and second substrate;

depressurizing the first cavity to move the flexible member out of contact with the one of the first and second substrate; and then pressurizing the second cavity to a second pressure higher than the first pressure to apply air pressure at the second pressure to the first and second substrate to form a laminated assembly;

wherein during the steps of pressurizing the first cavity, depressurizing the first cavity, and pressurizing the second cavity, the first and second substrates remain within the second cavity.

2. The method of claim 1, further comprising heating the lamination device such that heat energy is transferred from the lamination device to the first and second substrate.

3. The method of claim 2, further comprising maintaining the lamination device at an elevated temperature during pressurization and depressurization of the first cavity and during pressurization of the second cavity.

4. The method of claim 3, wherein the elevated temperature is approximately 80 degrees Celsius.

5. The method of claim 1, further comprising generating a vacuum environment within the second cavity prior to pressurizing the first cavity.

6. The method of claim 5, further comprising maintaining the vacuum environment within the second cavity until after depressurization of the first cavity.

7. The method of claim 5, further comprising:
maintaining a portion of the first substrate spaced apart from the second substrate prior to generating the vacuum environment within the second cavity; and
moving the portion of the first substrate into contact with the second substrate prior to pressurizing the first cavity.

8. The method of claim 1, wherein positioning the first and second substrate within the lamination device includes positioning the first and second substrate within the second cavity.

9. The method of claim 1, wherein positioning the first and second substrate within the lamination device includes moving the first and second substrate using a robotic loading device; and further comprising:
removing the laminated assembly from the lamination device using a robotic unloading device.

10. A method for laminating substrates to form a laminated assembly, comprising:
providing a lamination device having a first cavity to a first side of a flexible member and a second cavity to a second side of the flexible member
positioning a first substrate and a second substrate within the second cavity of the lamination device;
generating a vacuum environment within the second cavity surrounding the first and second substrate;
applying a first pressure via the first cavity to the flexible member to move the flexible member into contact with one of the first and second substrate;
moving the flexible member out of contact with the one of the first and second substrate; and then
applying air pressure at a second pressure higher than the first pressure to the first and second substrate within the second cavity to form a laminated assembly.

11. The method of claim 10, wherein the lamination device includes an upper member and a lower member, and wherein the cavity includes an upper cavity and a lower cavity;
wherein the upper member forms the upper cavity and the lower member forms the lower cavity;
wherein the first and second substrate are received within the lower cavity; and
wherein the flexible member is coupled to the upper member.

12. The method of claim 11, wherein applying the first pressure to the flexible membrane includes pressurizing the first cavity; and
wherein moving the flexible member out of contact with the one of the first and second substrate includes depressurizing the first cavity.

13. The method of claim 11, wherein the first and second substrate are positioned with the second cavity and the vacuum environment is generated within the second cavity.

14. The method of claim 10, further comprising maintaining the lamination device at an elevated temperature while the first and second substrate are positioned within the cavity.

15. The method of claim 10, further comprising maintaining a separation between the first substrate and the second substrate while generating the vacuum environment.

16. The method of claim 10, wherein the first substrate is a first rigid substrate and the second substrate is a second rigid substrate, and further comprising:
positioning a layer of adhesive between the first substrate and the second substrate.

17. A method for laminating rigid or semi-rigid substrates to form a laminated assembly, comprising:
providing a lamination device having an upper member forming an upper cavity and a lower member forming a lower cavity;
positioning a first substrate and a second substrate within the lower cavity;
disposing a layer of pressure-sensitive adhesive between the first substrate and the second substrate;
generating a vacuum within the lower cavity;
pressurizing the upper cavity to a first pressure to move a flexible member into contact with the first substrate;
depressurizing the upper cavity to move the flexible member out of contact with the first substrate; and then
pressurizing the lower cavity to a second pressure higher than the first pressure to apply air pressure at the second pressure to the first and second substrate to form a laminated assembly.

18. The method of claim 17, further comprising maintaining the lamination device at an elevated temperature while the first and second substrates are within the second cavity.

19. The method of claim 17, further comprising closing the upper member and the lower member together to form a sealed lamination cavity, the lamination cavity including the upper cavity and the lower cavity.

20. The method of claim 17, wherein the first substrate is a coverglass and the second substrate is an LCD assembly.

* * * * *